US008704750B2

(12) United States Patent
Yu

(10) Patent No.: US 8,704,750 B2
(45) Date of Patent: Apr. 22, 2014

(54) CONTROL APPARATUS USED IN THREE-DIMENSIONAL DISPLAY APPARATUS AND ASSOCIATED THREE-DIMENSIONAL GLASSES

(75) Inventor: Tien Hua Yu, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 475 days.

(21) Appl. No.: 13/044,839

(22) Filed: Mar. 10, 2011

(65) Prior Publication Data

US 2011/0285761 A1 Nov. 24, 2011

Related U.S. Application Data

(60) Provisional application No. 61/346,043, filed on May 19, 2010, provisional application No. 61/358,007, filed on Jun. 24, 2010.

(51) Int. Cl.
*G09G 3/36* (2006.01)
(52) U.S. Cl.
USPC 345/102; 348/51; 348/E13.001; 348/E15.001
(58) Field of Classification Search
USPC ................... 348/42–60, 761, 766, 348/E11.009–E15.001; 345/87–102; 349/15; 353/17
See application file for complete search history.

(56) References Cited

U.S. PATENT DOCUMENTS

| 8,363,096 | B1* | 1/2013 | Aguirre | 348/57 |
| 2009/0179850 | A1* | 7/2009 | Chen et al. | 345/102 |
| 2010/0289883 | A1* | 11/2010 | Goris et al. | 348/56 |
| 2011/0109733 | A1* | 5/2011 | Kim et al. | 348/56 |
| 2011/0292169 | A1* | 12/2011 | Jain | 348/43 |
| 2011/0292309 | A1* | 12/2011 | Lin et al. | 349/15 |

* cited by examiner

*Primary Examiner* — Amare Mengistu
*Assistant Examiner* — Vinh Lam
(74) *Attorney, Agent, or Firm* — Edell, Shapiro & Finnan, LLC

(57) ABSTRACT

A control apparatus for controlling a three-dimensional (3D) display apparatus includes: an image processing unit to receive an image source signal and convert the image source signal to an interval signal. The interval signal is defined as a first timing interval and a second timing interval. A backlight control device, coupled to the image processing unit, receives the interval signal and generates a plurality of backlight control signals according to the interval signal. A backlight device, coupled to the backlight control device, receives the plurality of backlight control signals and provides a lighting source to a display device during the first timing interval and/or the second timing interval according to the plurality of backlight control signals.

12 Claims, 12 Drawing Sheets

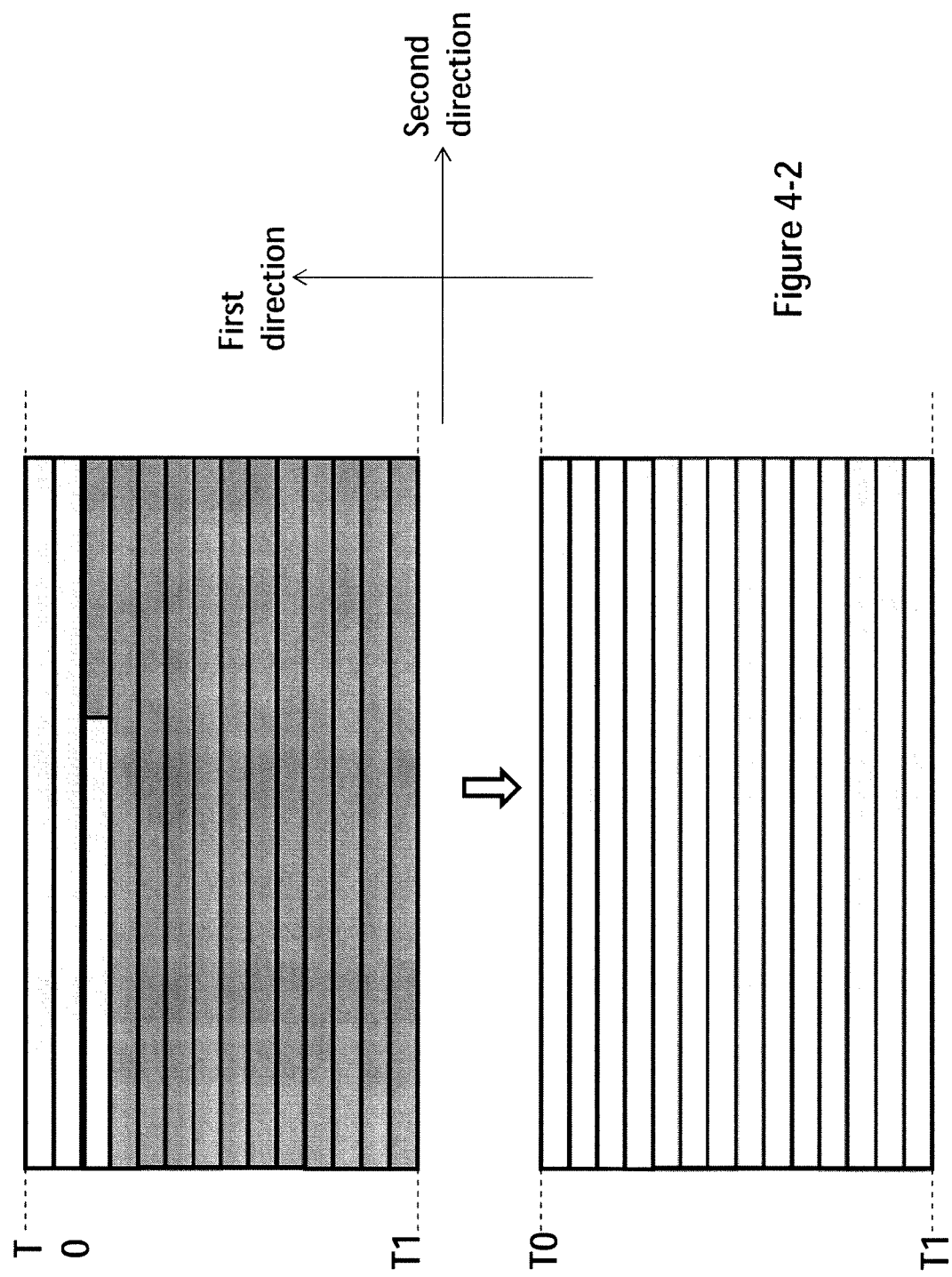

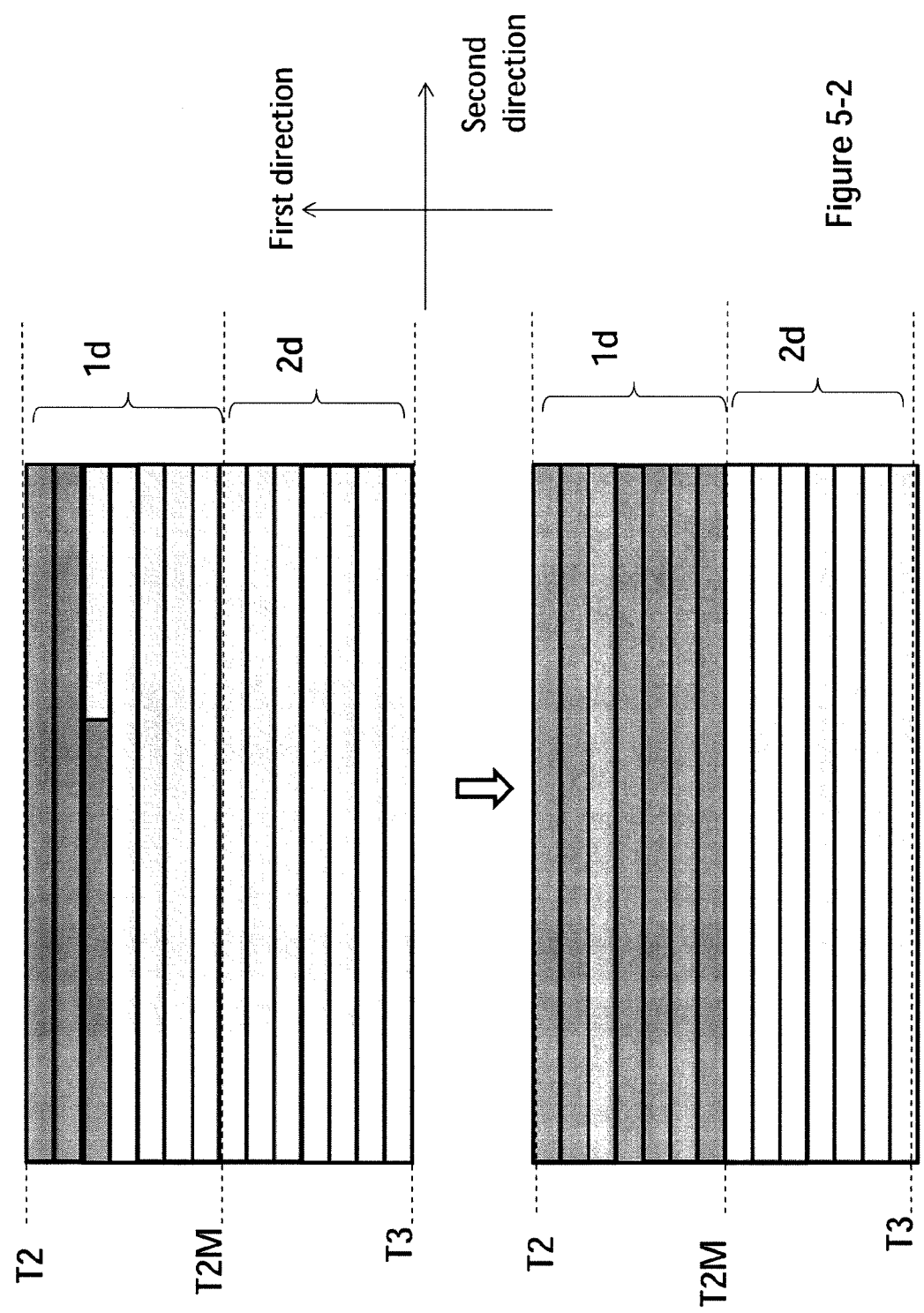

CONTROL APPARATUS USED IN THREE-DIMENSIONAL DISPLAY APPARATUS AND ASSOCIATED THREE-DIMENSIONAL GLASSES

CROSS REFERENCE TO RELATED PATENT APPLICATION

This patent application claims the benefit of U.S. provisional patent application Ser. No. 61/346,043 filed on May 19, 2010 and U.S. provisional patent application Ser. No. 61/358,007 filed on Jun. 24, 2010, both of which are incorporated herein by reference in their entireties.

FIELD OF THE INVENTION

The present invention relates to an apparatus for controlling a display apparatus, and more particularly, to a control apparatus for controlling a three-dimensional (3D) display apparatus and associated pair of 3D glasses.

BACKGROUND OF THE INVENTION

Generally, a stereo image display system achieves a stereo display effect by providing two sets of images that a left eye and a right eye of a viewer perceives in a time-interleaved manner. That is, when an image to be provided to the left eye of the viewer is displayed on a screen, only the left eye of the viewer can see the image; when an image to be provided to the right eye of the viewer is displayed on the screen, only the right eye of the viewer can see the image. To achieve the stereo effect in the prior art, left-eye and right-eye image frames are respectively alternately displayed in different timing intervals.

FIG. 1 shows a schematic diagram of timing of a control signal of a conventional stereo image display system. An image frame update signal (i.e., an interval signal) frm_u represents an updating cycle of different groups of image frames, e.g., during an interval between a time point T0 and a time point T1, the image frame update signal is maintained at a logical high level to update a right-eye image frame. At the time point T1, the right-eye image frame update ends, and the interval signal frm_u turns to a low level representing a logical low state. When the interval signal enters the logical low state, it means that the image signal enters an image vertical blanking interval (VBI) during which an updated right-eye image frame is completely displayed on the screen. The VBI lasts to the time point T2 from when the interval signal frm_u changes to a high level, so that the left-eye image frame begins updating to enter a left-eye image frame updating interval. Likewise, the left-eye image frame update lasts to time point T3 after which another VBI begins.

It is necessary for a viewer to wear a pair of 3D glasses to perceive the accurate stereo images by displaying left-eye and right-eye images in sequence by the stereo display system. Referring to FIG. 1, when the right-eye image frame is already updated and displayed on the screen during the VBI, a right-eye shield of the pair of 3D stereo glasses worn by the viewer is turned off, so that the right eye of the viewer is not shielded and the viewer can view the updated right-eye image frame. Likewise, when the left-eye image frame update is finished and the left-eye image frame is displayed on the screen during another VBI, a left-eye shield of the pair of 3D stereo glasses worn by the viewer is turned off, so that the left eye of viewer can view the updated left-eye image frame. Accordingly, the left eye and the right eye of the viewer can respectively view the updated left-eye and right-eye images during different timing intervals.

However, during the updating interval of the right-eye (or left-eye) image frame, the right-eye (or left-eye) image frame is being updated, if the right-eye (or left-eye) image frame is displayed during this time, the right-eye image frame shown is not a complete frame. Because a backlight module of a conventional display device is always turned on (backlight control signal bl_c shown in FIG. 1), the incomplete images are displayed on the screen. Therefore, in the prior art, during the right-eye (or left-eye) image frame updating interval, the left-eye shield and the right-eye shield of the pair of 3D stereo glasses are simultaneously turned on (i.e., shielding) to avoid viewing any incomplete right-eye or left-eye images that are being updated.

In other words, the left-eye shield and the right-eye shield of the pair of 3D stereo glasses worn by the viewer are turned off (shielding is off) only during VBIs to receive images displayed; however, light received by the viewer is very limited due to the short viewing time (because VBI is relatively short). The duty cycle of the VBI of the conventional stereo image display system is usually 30%, which also means that light-emitting efficiency of the display system is likewise only 30%.

Furthermore, in order to configure with the conventional stereo image display system as shown in FIG. 1, a control signal e_ctrl having a highly complex voltage triggering mechanism is needed to enable accurate turn-offs or turn-ons of the right-eye shield and the left-eye shield of the pair of 3D stereo glasses, which causes the stereo image display system to be of high hardware or software complexity.

Therefore, an advanced control to the backlight module of the 3D stereo image system is desired so that the backlight module can provide light source in different timing intervals (i.e., emitting or not emitting lights, and providing or not providing a light source to the displayer).

SUMMARY OF THE INVENTION

According to an embodiment of the present invention, a control apparatus for controlling a 3D displayer and a pair of 3D glasses is provided. The control apparatus comprises an image processor for receiving an image source signal and converting the image source signal to an interval signal that defines a first timing interval and a second timing interval; a backlight control apparatus, coupled to the image processor, for receiving the interval signal, and generating a plurality of backlight control signals according to the interval signal; and a backlight apparatus, coupled to the backlight control apparatus, for receiving the plurality of backlight control signals, and providing a light source to a displayer during the plurality of first and/or second timing intervals according to the plurality of backlight control signals.

Further characteristics and advantages of the present invention will be apparent from the following description while a part of the present invention is acquired therein or is learned by implementing an embodiment of the present invention, and can be understood and achieved via components and combinations thereof specified in attached claims.

BRIEF DESCRIPTION OF THE DRAWINGS

FIG. 4-1 is a schematic diagram of timing of a control signal and an image signal of a control system of a stereo image displayer in accordance with an embodiment of the present invention.

FIG. 4-2 is a schematic diagram of an arrangement for updating a right-eye image frame in accordance with an embodiment of the present invention.

FIG. 4-3 is a schematic diagram of dividing methods and corresponding relationships among divided portions of a backlight apparatus and a display apparatus in accordance with an embodiment of the present invention.

FIG. 4-4 is a schematic diagram of an arrangement for updating a first portion of a current right-eye image frame in accordance with an embodiment of the present invention.

FIG. 5-1 is a schematic diagram of an arrangement for updating a left-eye image frame in accordance with an embodiment of the present invention.

FIG. 5-2 is a schematic diagram of an arrangement for updating a first portion of a left-eye image frame in accordance with an embodiment of the present invention.

FIG. 6-1 is a schematic diagram of a dividing method and corresponding relationships among division portions of a backlight apparatus and a display apparatus in accordance with an embodiment of the present invention.

FIG. 6-2 is a schematic diagram of an update method of a current right-eye image frame in accordance with an embodiment of the present invention.

FIG. 6-3 is a schematic diagram of an update method of a current right-eye image frame and a level conversion mechanism of a corresponding signal in accordance with an embodiment of the present invention.

DETAILED DESCRIPTION OF THE PREFERRED EMBODIMENT

The spirit and embodiments of the present invention will be further understood via the following detailed description and figures. Same or similar components of the embodiments are presented in the figures in the same or similar manners.

Figure 2:
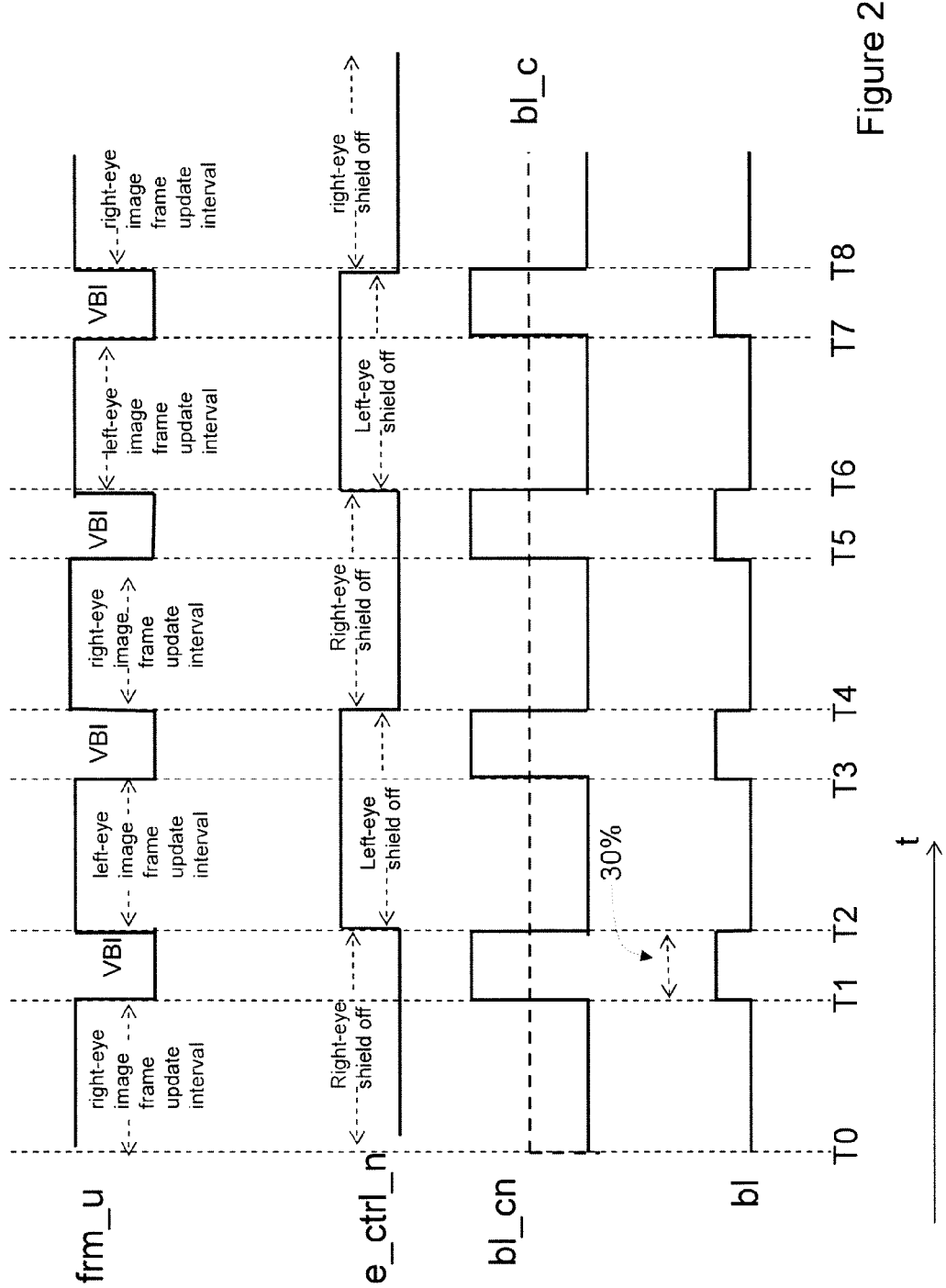
FIG. 2 is a schematic diagram of timing of a control signal of a stereo image display system in accordance with an embodiment of the present invention.

FIG. 2 is a timing diagram of a control signal of a 3D image display system in accordance with an embodiment of the present invention. An image frame update signal (i.e., an interval signal) frm_u is at a high voltage level which represents a logical high level during an interval from a time point T0 to a time point T1, to enable a right-eye image frame update. The right-eye image frame update ends at the time point T1 where the interval signal frm_u changes from the logical high level to a logical low level. The logical low level lasts for an interval between the time point T1 and a time point T2. According to the changes of the interval signal frm_u, a VBI interval begins at the time point T1 and ends at the time point T2. At the time point T2, the interval signal frm_u again switches from the logical low level to the logical high level, and forms a rising edge at the time point T2. The rising edge triggers updating of a left-eye image frame.

The updating of the left-eye image frame ends at a time point T3 where another VBI starts to last until a time point T4. After that, an interval for updating a next right-eye image frame begins, and so forth.

In this embodiment, the 3D stereo image display system further comprises a backlight control signal bl, which has a logical high voltage level representing a logical high state and a logical low voltage level representing a logical low state. When the backlight control signal bl is at the logical high level, the backlight device of the display device is on; when the backlight control signal bl is at the logical low level, the backlight device of the display device is off. The backlight control signal bl is at the logical high level only during VBIs (e.g., the interval between the time points T1 and T2, the interval between the time points T3 and T4, the interval between time points T5 and T6 and the interval between time points T7 and T8), such that the backlight device of the display device provides a light source such that the updated right-eye or left-eye image frame is displayed.

In each image frame update interval (e.g., the interval between the time points T0 and T1, the interval between the time points T2 and T3, the interval between the time points T4 and T5 and the interval between the time points T6 and T7), the backlight control signal bl is at the logical low state. During these image frame update intervals, because the backlight is off, the display screen cannot display the images and, as such, viewers cannot view the right-eye or left-eye image frame that is being updated.

Based on the configurations of the foregoing control signals, in this embodiment, a pair of 3D glasses is provided for viewers. A right-eye (or left-eye) shield of this pair of 3D stereo glasses is not only turned off (not shielding) during every VBI, but also is turned off during every right-eye (left-eye) image frame updating interval, while the right eye (or the left eye) of the viewer still only perceives the complete right-eye (or left-eye) image frame that is already updated. As shown in FIG. 2, a duty cycle of shielding period (turn on) of the right-eye shield or the left-eye shield is 50%. Please note that the right-eye shield and the left-eye shield of the 3D glasses do not simultaneously turn off or turn on (i.e., when the right-eye shield is on, the left-eye shield is off, and vice versa.). Accordingly, complexity of the triggering mechanism of a glasses control signal e_ctrl_n for controlling the right-eye shield and the left-eye shield is effectively decreased.

Figure 1:
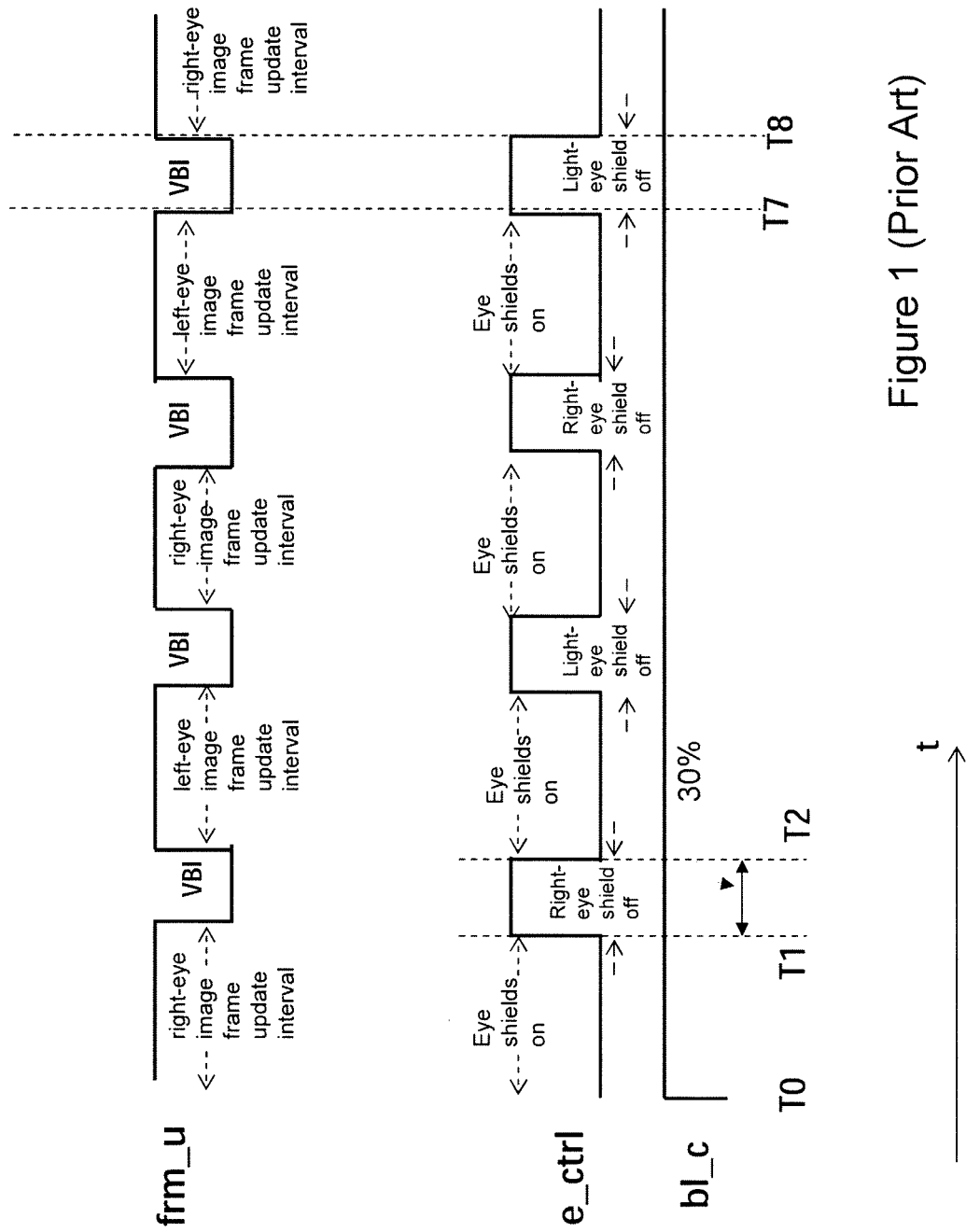
FIG. 1 is a schematic diagram of timing of a control signal of a conventional stereo image display system.

Furthermore, assume that the average power consumption remains the same as that in the example in FIG. 1, because the backlight apparatus of the display device of the embodiment of the present invention is on only in the VBI intervals according to the backlight control, the backlight device of the present invention is able to provide lights with higher luminance in the VBIs. Referring still to FIG. 2, the backlight luminance bl_cn provided by the backlight apparatus of the present invention is higher than the backlight luminance bl_c in the prior art (e.g., marked by dashed lines); therefore, a light-emitting efficiency of the display device is increased in the embodiment of the present invention. In another embodiment of the present invention, when the backlight luminance bl_cn during the VBIs is increased, on the premise that the light-emitting efficiency stays unchanged, the VBIs can be further reduced to 10%, for example.

Please note that the backlight luminance bl_cn provided by the backlight device is directly proportional to the number of light-emitting particles (such as LEDs) per area unit of the backlight device. In addition, the backlight luminance bl_cn provided by the backlight apparatus can also be directly proportional to a current intensity provided to an overall backlight apparatus.

Figure 3:
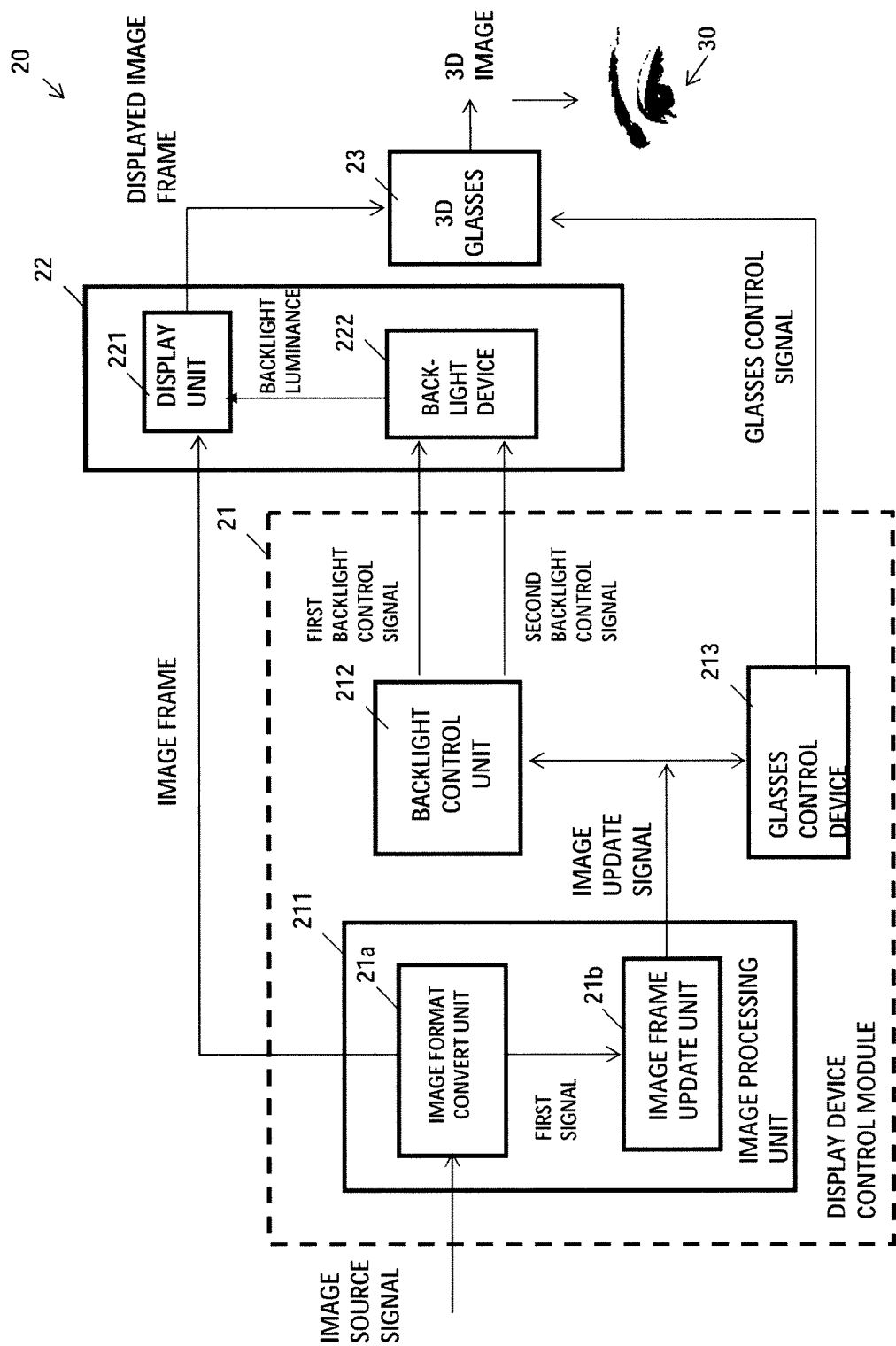
FIG. 3 is a block diagram of a control system of a stereo image displayer in accordance with another embodiment of the present invention.

FIG. 3 is a block diagram of a control system of a stereo image display device in accordance with an embodiment of the present invention. Control system 20 comprises a display device control module 21, a display device 22 and a pair of 3D glasses 23. The display device control module 21 comprises an image processing apparatus 211, a backlight control apparatus 212 and a glasses control apparatus 213. The display device 22 comprises a display unit 221 and a backlight device 222. In addition, the image processing unit 211 comprises an image format converting unit 21a and an image frame updating unit 21b.

The image format converting unit 21a receives an image source signal that is converted to a left-eye image frame and a right-eye image frame that are to be outputted. The display unit 221 coupled to the image format converting unit 21a receives the left-eye image frame and the right-eye image frame from the image format converting unit 21a.

In addition, the image format converting unit 21a converts the image source signal to a first signal. The image frame updating unit 21b receives the first signal from the image format converting unit 21a.

The image frame updating unit 21b generates and outputs an interval signal frm_ul according to the first signal. The backlight control apparatus 212 and the glasses control apparatus 213 respectively coupled to the image frame updating unit 21b respectively receive the image frame updating signal frm_u.

The backlight control apparatus 212 generates and outputs a first backlight control signal bl_n and a second backlight control signal bl_2 according to the received interval signal frm_u. The backlight apparatus 222 is coupled to the backlight control apparatus 212 to receive the first backlight control signal bl_1 and the second backlight control signal bl_2.

The glasses control apparatus 213 generates and outputs a corresponding glass control signal e_ctrl according to the received interval signal frm_u. The pair of 3D glasses 23 is coupled to the glasses control apparatus 213 to receive the glasses control signal e_ctrl.

The backlight apparatus 222 of the display device 22 is coupled to the display unit 221 to provide a light source to the display unit 221. The display unit 221 receives the left-eye image frame and the right-eye image frame from the image format converting unit 21a, and converts them to a left-eye image frame and right-eye that are ready to be displayed.

The pair of 3D glasses 23 comprises a left-eye shield and a right-eye shield (not shown), which are respectively turned off or turned on according to the glass control signal, so that a left eye and a right eye of a viewer 30 can respectively view the displayed left-eye image frame and the displayed right-eye image frame via the pair of 3D glasses, and view a stereo image formed by the displayed left-eye image frame and the displayed right-eye image frame due to visual persistence of human eyes.

Figures 1, 4:
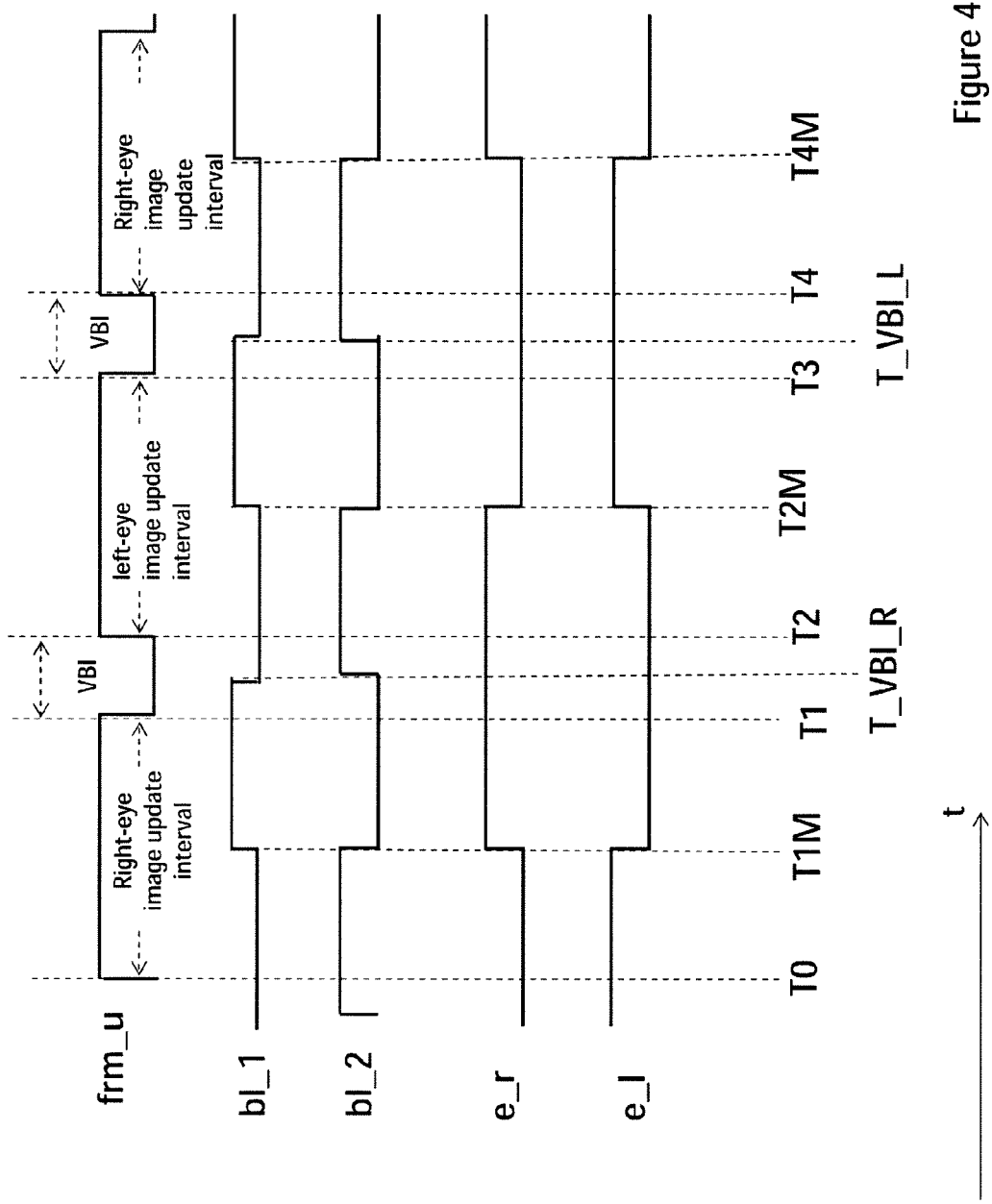
Figures 3, 4:
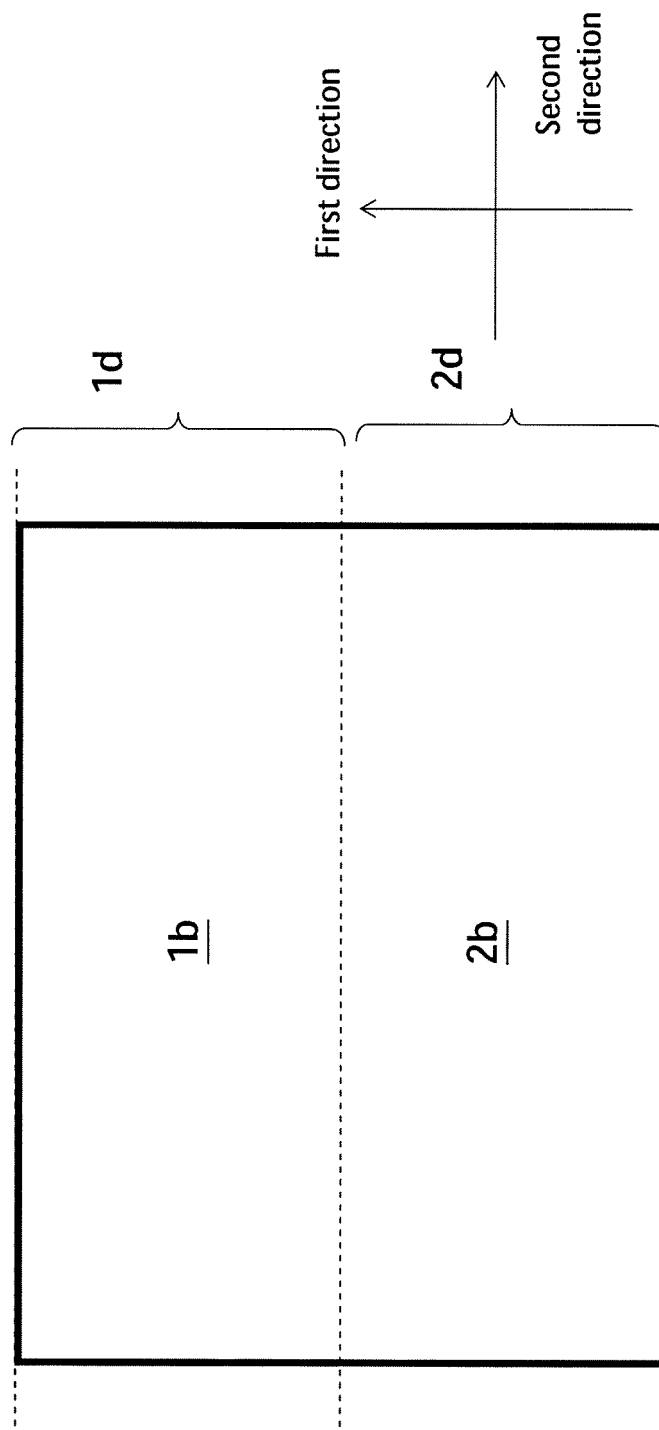
Figure 4:
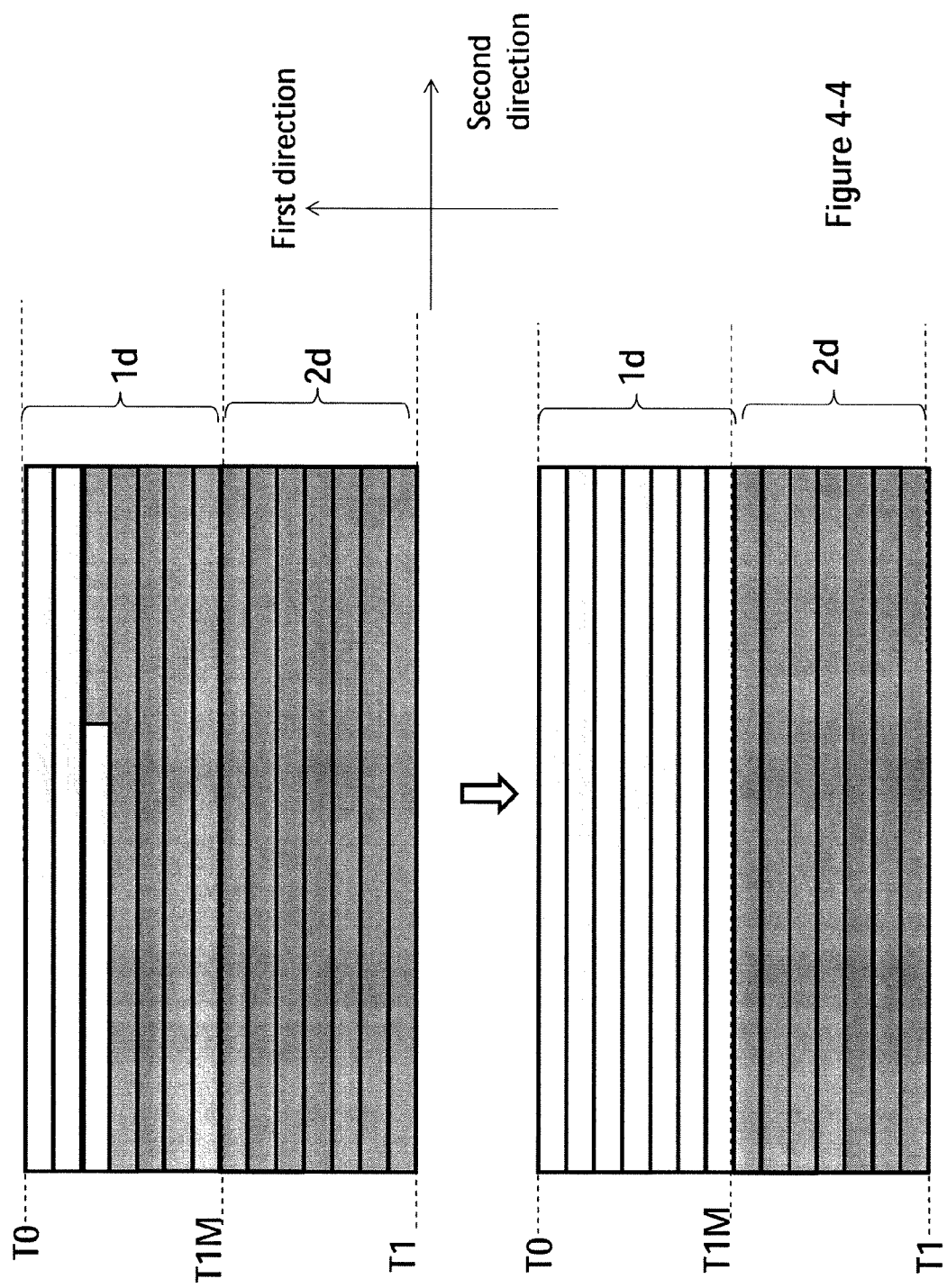

FIG. 4-1 is a schematic diagram of timing of a control signal of a stereo image display device control system in accordance with an embodiment of the present invention. The voltage level of an interval signal frm_u changes at different time points, and a plurality of first timing intervals and a plurality of second timing intervals are respectively defined according to different voltage levels of the interval signal frm_n.

For example, each of the first timing intervals is an image frame updating interval that includes a right-eye image frame updating interval and a left-eye image frame updating interval. The second timing interval is an image converting interval, for example. In an embodiment, the image converting interval is an image VBI. During the right-eye and left-eye image frame updating intervals, the right-eye and left-eye image frames are respectively being updated; during the VBIs, the right-eye or the left-eye image frame that was being updated in the previous updating interval is finished its update and displays for the entire VBI.

In this embodiment, an interval between time points T0 and T1 is a right-eye image frame updating interval, i.e., the interval signal frm_u has a rising edge at the time point T0 that triggers update of a right-eye image frame, and the update of the right-eye image frame ends at the time point T1.

However, a person ordinary skilled in the art will appreciate that the voltage level conversion of the interval signal frm_u may be realized in different ways. For example, the interval signal frm_u has a falling edge for triggering update of the right-eye image frame at the time point T0, and update of the right-eye image frame ends at the time point T1, so that the interval signal frm_u converts to the logical high level at the time point T1 to form a rising edge. Other level conversion approaches of control signals are accordingly analyzed.

The interval signal frm_u converts to the logical low level at the time point T1 to enter the VBI from time point T1 to time point T2. Update of the right-eye image frame completes at the time point T1, then the complete right-eye image frame stays (not overwritten/replaced by other frames) for the entire VBI In this embodiment, the stereo image display device control system regularly updates image frames. An interval between time points T2 and T3 is a left-eye image frame updating interval, and the length of the updating interval between the time points T2 and T3 is equal to that of the updating interval between the time points T0 and T1. The interval signal frm_u converts to the logical high level at the time point T2 and again triggers updating of a left-eye image frame, and update of the left-eye image frame ends at the time point T3. Likewise, following the update of the left-eye image frame interval is the VBI (e.g., an interval between time points T3 and T4 shown in FIG. 4-1), and operation thereof is the same as that of the VBI between the time points T1 and T2.

FIG. 4-2 shows a schematic diagram of an update of a right-eye image frame in accordance with an embodiment of the present invention. From time point T0, scanning of the right-eye image frame is performed in the row along a second axis direction from the time point T0, then scanning continues row-by-row from top to bottom in a first axis direction according to the foregoing scan approach to replace a previous left-eye image frame row-by-row. At time point T1, the right-eye image frame update is complete and replaces the previous left-eye image frame. Details of updating of the right-eye image frame are described below.

FIG. 4-3 is a schematic view of the light-emitting areas partitioned on the backlight device and the display device in accordance with an embodiment of the present invention. In this embodiment, the display unit 221 has two equally divided portions 1d and 2d with equal areas, and the backlight device also has two light-emitting areas 1b and 2b corresponding to the display portions 1d and 2d. To be more specific, the first light-emitting area 1b of the backlight device corresponds to the first portion 1d of the display unit 221, and the second light-emitting area 2b corresponds to the second portion 2d of the display unit 221. In addition, a right-eye image frame also can be defined as two portions with equal areas—a first portion 1r corresponds to the first light-emitting area 1b of the backlight device and the first portion 1d of the display unit 221, and a second portion 2r of the frame corresponds to the second light-emitting area 2b of the backlight device and the second portion 2d of the display unit (the first and second portions 1r and 2r of the right-eye image frame are not shown in FIG. 4-3). Similarly, the left-eye image frame also has two portions—a first portion 11 and a second portion 21 (not shown in FIG. 4-3).

FIG. 4-4 is a schematic diagram of an update process of the first portion 1r of the current right-eye image frame in accordance with an embodiment of the present invention. The first portion 1r the current right-eye image frame update begins, at the time point T0, from the top part of display screen, scanning of the portion 1r of the current right-eye image frame firstly is performed in a second axis direction then row-by-row from top to bottom in a first axis direction to replace the first portion 11 of a previous updated left-eye image frame row-by-row. At time point T1, the update of the entire right-eye image frame is complete where the previous left-eye image frame is replaced. At a time point T1M, the first portion 1r of the current right-eye image frame is done or finished its update, which corresponds to the first portion 1d of the display unit and completely replaces the first portion 11 of the previous left-eye image frame. The associated control signal, e.g., an interval signal frm_u, a first backlight control signal bl_1 and a second backlight control signal bl_2, timing level conversions for the first portion 1r of right-eye image frame update are described in the following paragraphs in association with FIG. 4-1.

Referring to FIG. 4-1, at the time point TIM, because the first portion 1r of the right-eye image frame update is finished, the first portion 1r of the current right-eye image frame is displayed on the first portion 1d of the display unit 221. The first backlight control signal bl_1 controls the first light-emitting area 1b of the backlight device corresponding to the first portion 1d of the display unit. More specifically, the first backlight control signal bl_1 converts from the low logical level to the high logical level at the center time point of the current right-eye image frame updating interval to form a rising edge at the time point T1M. The timing change of the first backlight control signal bl_1 is achieved by driving rising edges or falling edges of a first backlight control clock.

When the first backlight control signal bl_1 is at the logical high level, backlight provides a first luminance in the first light-emitting area 1b to the first portion 1d of the display unit 221. Therefore, the updated first portion 1r of the right-eye image frame is displayed on the first portion 1d of the display unit 221.

The first backlight control signal bl_1 is maintained at the logical high level during a second half part (i.e., the interval between time points T1M and T1) of the right-eye image frame updating interval, so that backlights having the first luminance are continuously provided in the first light-emitting area 1b of the backlight apparatus to the first portion 1d of the display unit 221. Therefore, the currently updated first portion 1r of the right-eye image frame is continuously displayed on the first portion 1d of the display apparatus 221 between the time points T1M and T1.

The left-eye/right-eye shield control signals of the pair of 3D glasses are changed according to the interval state frm_u. More specifically, a right-eye shield control signal e_r is triggered to change from the logical low level to the logical high level at the time point T1M. The right-eye shield control signal e_r at the logical high level drives the right-eye glass of the pair of 3D glasses 23 to turn off (no shielding), so that the right eye of the viewer can see the updated first portion 1r of the right-eye image frame via the pair of 3D glasses 23.

Because the first light-emitting area of the backlight device provides first luminance to the first portion 1d of the display unit 22 continuously for the interval between time points T1M and T1, the updated portion 1r of the right-eye image frame is displayed on the first portion 1d of the of the display device. Therefore, the right eye of the viewer 30 can continuously view the updated first portion 1r of the right-eye image frame for the entire interval between the time points T1M and T1.

A similar update process is performed on the second portion 2r of the right-eye image frame to that of the first portion 1r of the right-eye image frame described in association with FIG. 4-4. Furthermore, the second portion 2r of the right-eye image frame update finishes at time point T1 (which means the entire right-eye image frame is updated) before the next left-eye image frame update begins.

Again with reference to FIG. 4-1, at the time point T1, the interval signal forms a falling edge when converting from the high logical level to the low logical level. VBI lasts from time point T1 to time point T2. During this VBI, because the entire right-eye image is updated, the updated second portion 2r of the right-eye image frame is ready to be displayed on the second portion 2d of the display apparatus 221.

More specifically, in the embodiment illustrated in FIG. 4-1, the first backlight control signal bl_1 is at the logical high level from the time point TIM to a time point T_VBI_R, and converts to the logical low level at the time point T_VBI_R, while at the same time a second backlight control signal bl_2 converts to the logical high level. Therefore, the first light-emitting area 1b provides the first luminance continuously in the interval between the time points T1 and T_VBI_R to the first portion 1d of the display unit 221, so that the first portion 1r of the updated current right-eye image frame is continuously displayed on the first portion 1d of the display during the interval between the time points T1 and T_VBI_R.

The second backlight control signal bl_2 converts to the logical high level at the time point T_VBI_R, so that the second light-emitting area 2b of the backlight apparatus 222 provides the first luminance to the second portion 2d of display unit 221 so that the currently updated second portion 2r of the right-eye image frame displays on the second portion 2d of the display apparatus 221. The second backlight control signal bl_2 maintains at the logical high level until a midpoint T2M of the left-eye image frame updating interval. Therefore, the updated second portion 2r of the right-eye image frame continuously displays on the second portion 2d of the display unit 221 in the interval between time points T_VBI_R and T2M.

In addition, it is necessary that the right-eye shield control signal e_r is maintained at the logical high level in the interval between time points T1M to T2M to maintain the turn-off state of the right-eye shield of the pair of 3D glasses 23 therein. Furthermore, during a first half (i.e., the interval between the time points T1M and T_VBI_R) of the right-eye shield turn-off interval (i.e., the interval between the time points T1M and T2M), the viewer's right eye receives the updated first portion 1r of the right-eye image frame from the first portion 1d of the display apparatus 221 through the turn-off right-eye shield. During the second half (i.e., the interval between the time points T_VBI_R and T2M) of the right-eye shield turn-off interval (i.e., the interval between the time points T1M and T2M), the viewer's right eye receives the updated second portion 2r of the right-eye image frame from the second portion 2d of the display apparatus 221 through the turn-off right eye shield.

In this embodiment, an image frame updating frequency F_frm is represented by:

$$F\_frm = 1/[(T\_update + T\_VBI) \times 2] \quad \text{(Equation 1)},$$

where T_update is a total time length of the right-eye (or left-eye) image frame updating interval:

$$T\_update = (T1 - T0) \quad \text{(Equation 2)},$$

and T_VBI is the total time length of the right-eye (or left-eye) VBI:

$$T\_VBI = (T2 - T1) \quad \text{(Equation 3)}.$$

The image frame updating frequency F_frm is far faster than a human visual persistence frequency (i.e., 1/24 seconds). Therefore, during the right-eye shield turn-off interval, the viewer does not perceive that the first portion 1r and the second portion 2r of the right-eye image frame display on different portions of the display apparatus 221 (i.e., the first portion 1d and the second portion 2d) in two subsequent sub-intervals respectively. Therefore, the viewer's right eye perceives as if the entire right-eye image frame displays on the display at the same time.

In the prior art, because the backlight device that provides the entire display screen light source is maintained at a high-luminance state, the right-eye shield turns on during the right-eye image frame updating interval and can only turn off after the right-eye image frame update completes (i.e., in VBI), so as to prevent the right eye of the viewer from viewing the right-eye image frame that is being updated. In contrast, in the embodiment of the present invention the right-eye shield is not only turned off during the VBI (i.e., the interval between the time points T1 and T2), but also turned off during part of the right-eye image frame updating interval (i.e., the interval between the time points T1M and T1) and a part of the left-eye image frame updating interval (i.e., the interval between the time points T2 and T2M). More specifically, although the current right-eye image frame is being updated in the current right-eye image frame updating interval (i.e., the interval between the time points T0 and T1), in this embodiment, as mentioned above, the first and second light-emitting area 1b and 2b of the backlight device 222 respectively corresponding to the first portion 1d and the second portion 2d of the display unit 221 are respectively dimmed or bright according to the starting time and ending time of updates of the first and second portions 1r and 2r of the current right-eye image frame. The turn-ons and turn-offs of the right-eye shield of the pair of 3D glasses 23 are performed according to the time periods that the image frames remain on the screen with backlight, so that the right eye of the viewer perceives the complete right-eye image frame. In this embodiment, because the right-eye shield turn-off interval extends beyond the VBI, the viewer receives the light source transmitted from the display device 22 for a longer duration (compared to the prior art) such that emitting efficiency of the display device 22 increases. More specifically, the duty cycle of the right-eye shield turn-off interval extends to at most 50%.

Still referring to FIG. 4-1, during the interval between the time points T0 and T1M, although the first portion 1r of the current right-eye image frame is being updated, the first portion of backlight apparatus 222 is turned off by control of the backlight signal bl_1 which is at the logical low level, so that the first portion 1d of the display unit 221 cannot obtain the light source from the first light-emitting area 1b of the backlight apparatus 22. Therefore, the viewer cannot view the first portion 1r of the current right-eye image frame that is being updated.

Update of the first portion 1r of the current right-eye image frame ends at the time point T1M, at the same time, the first backlight signal bl_1 enters the logical high level state to turn on the first light-emitting area 1b of the backlight apparatus 222, so that the first light-emitting area 1b of the backlight apparatus 222 provides first luminance to the first portion 1d of the display unit 221, and thus the updated first portion 1r of the right-eye image frame is displayed on the first portion 1d of the display unit 221. The right-eye shield is turned off at the time point T1M, so that the right eye of the viewer 30 receives the first portion 1r of the updated right-eye image frame.

While the second portion 2r of the current right-eye image frame is being updated during the interval between the time points T1M and T1, the second backlight signal bl_2 is at the logical low level state where the second light-emitting area 2b of the backlight apparatus 222 does not provide lights. Accordingly, the viewer cannot view the second portion 2r of the right-eye image frame that is being updated.

Update of the second portion 2r of the current right-eye image frame completes at the time point T1 (where the entire current right-eye image frame update completes), and the entire current right-eye image frame is continuously being displayed for the whole VBI (the interval between the time points T1 and T2). At the center point T_VBI_R of the current VBI, the second backlight signal bl_2 enters the logical high level state to turn on the second light-emitting area 2b of the backlight apparatus 222 for providing desired backlights to the second portion 2d of the display apparatus 221. Therefore, the updated second portion 2r of the current right-eye image frame is displayed on the second portion 2d of the display apparatus 221. At this point, the right-eye shield is maintained in a turned-off state, so that the right eye of the viewer receives the updated second portion 2r of the current right-eye image frame.

During an interval between time points T2 and T2M, while a first portion 11 of the a left-eye image frame is being updated, the first backlight signal bl_1 converts to the logical low level at the time point T_VBI_R such that the first light-emitting area 1b of the backlight apparatus 222 does not provide lights. Therefore, the right-eye of the viewer cannot view the first portion 11 of the left-eye image frame while it is being updated although the right-eye shield is being turned off during the interval between the time points T2 and T2M.

In conclusion, the right-eye shield turn-off interval is between the center point T1M of the current right-eye image frame updating interval and the center point T2M of the next left-eye image frame updating interval, where the cycle is 50%.

After the VBI (i.e., the interval between the time points T1 and T2), the left-eye image frame update process is performed in an interval between time points T2 and T3. The left-eye image frame update is similar to that of the right-eye image frame, and is described below.

Figures 1, 5:
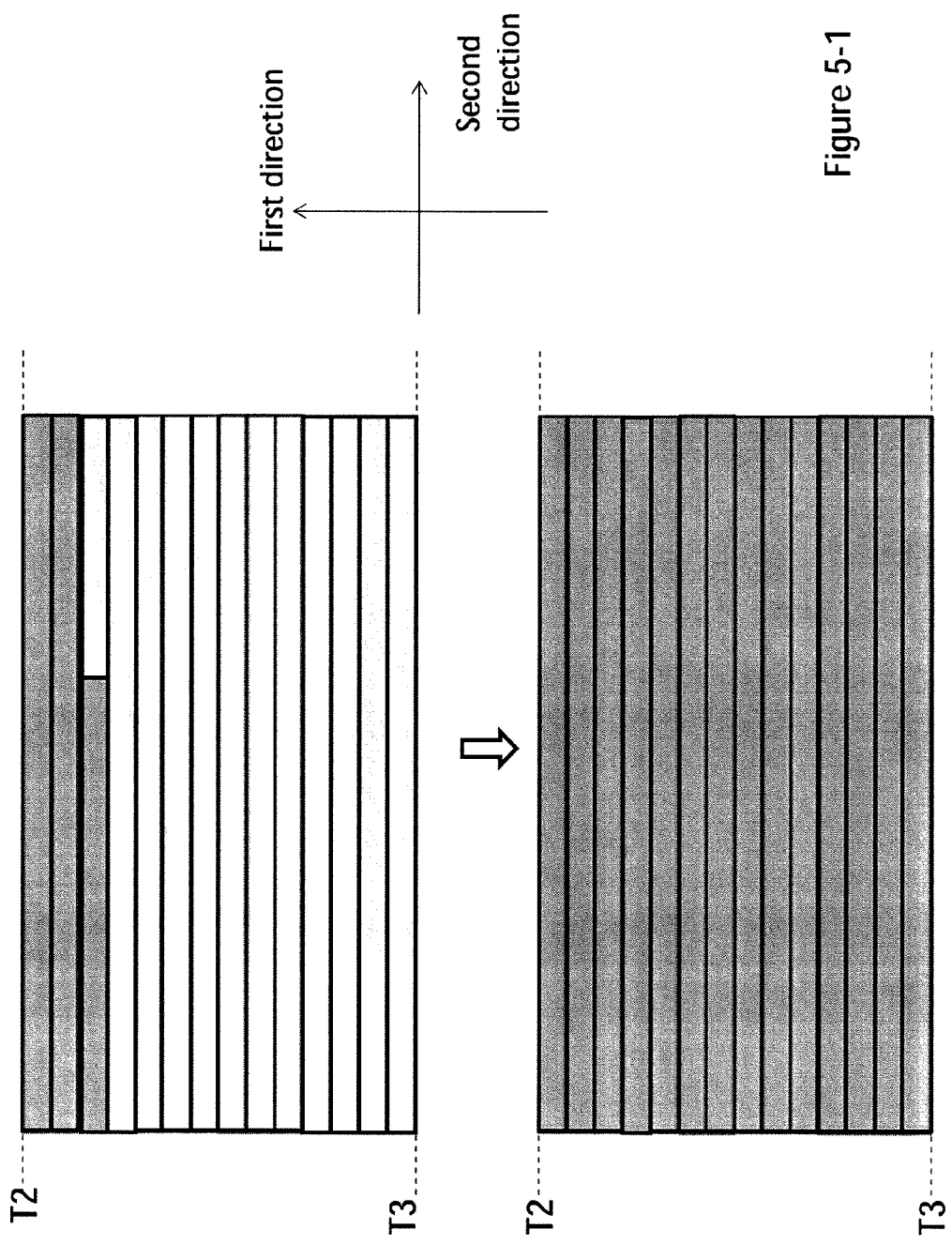

FIG. 5-1 is a schematic diagram of the left-eye image frame update in accordance with an embodiment of the present invention. From the time point T2, scanning of the left-eye image frame is firstly performed in a second axis direction, then from top to bottom in a first axis direction to replace the previous right-eye image frame row-by-row. The left-eye image frame update completes at the time point T3, which means the previous right-eye image frame is totally replaced. Details of the updating of the left-eye image frame are to be described below.

FIG. 5-2 is a schematic diagram of the first portion 11 of the left-eye image frame update in accordance with an embodiment of the present invention. The updating approach is identical to that of the first portion 1r of the current right-eye image frame as illustrated in FIG. 4-4. The first portion 11 of the left-eye image frame is updated row-by-row from the time point T2 to replace the first portion 1r of the updated right-eye image frame row-by-row. At the time point T2M, update of the first portion 11 of the left-eye image frame completes and the first portion 1r of the updated right-eye image frame is completely replaced. More specifically, referring to FIG. 4-1, at the time point T2M, since the update of the first portion 11 of the left-eye image frame is complete, the first portion 11 of the left-eye image frame can be displayed on the first portion 1d of the display apparatus 221. The first backlight control signal bl_1 converts from the logical low level to the logical high level at the center point T2M of the left-eye image frame updating interval to form a rising edge. Change of the first backlight control signal bl_1 is achieved by driving a first backlight control clock.

When the first backlight control signal bl_1 is at the logical high level, the first light-emitting area 1b of the backlight apparatus 222 provides the first luminance driven by the first backlight control signal bl_1. Therefore, the first portion 11 of the updated left-eye image frame is displayed on the first portion 1d of the display apparatus 221.

The first backlight control signal bl_1 is maintained at the logical high level during the second half (i.e., the interval between the time points T1M and T1) of the right-eye image frame updating interval, so that backlights having the first luminance are continuously generated in the first emitting area 1b of the backlight apparatus 222 to the first portion 1d of the display apparatus during the interval between the time points T1M and T1. Therefore, the first portion 1r of the current right-eye image frame is continuously displayed on the first portion 1d of the display apparatus 221 during the interval between the time points T1M and T1.

According to the interval signal frm_u, a left-eye shield control signal e_1 converts from the logical low level to the logical high level at the time point T2M. The left-eye shield control signal e_1 at the logical high level drives to turn off (no shielding) the left-eye shield of the pair of 3D glasses 23, and thus the left eye of the viewer can view the updated first portion 11 of the left-eye image frame via the pair of 3D glasses 23.

The left-eye shield control signal e_1 is maintained at the logical high level during an interval between time points T2M and T3, so that the left-eye shield is maintained in a turned-off state. Therefore, the left eye of the viewer 30 continuously views the first portion 11 of the updated next left-eye image frame between the time points T2M and T3. Update of a second portion 21 of the left-eye image frame is similar to that of the first portion 11, and will not be described for brevity.

Figures 1, 6:
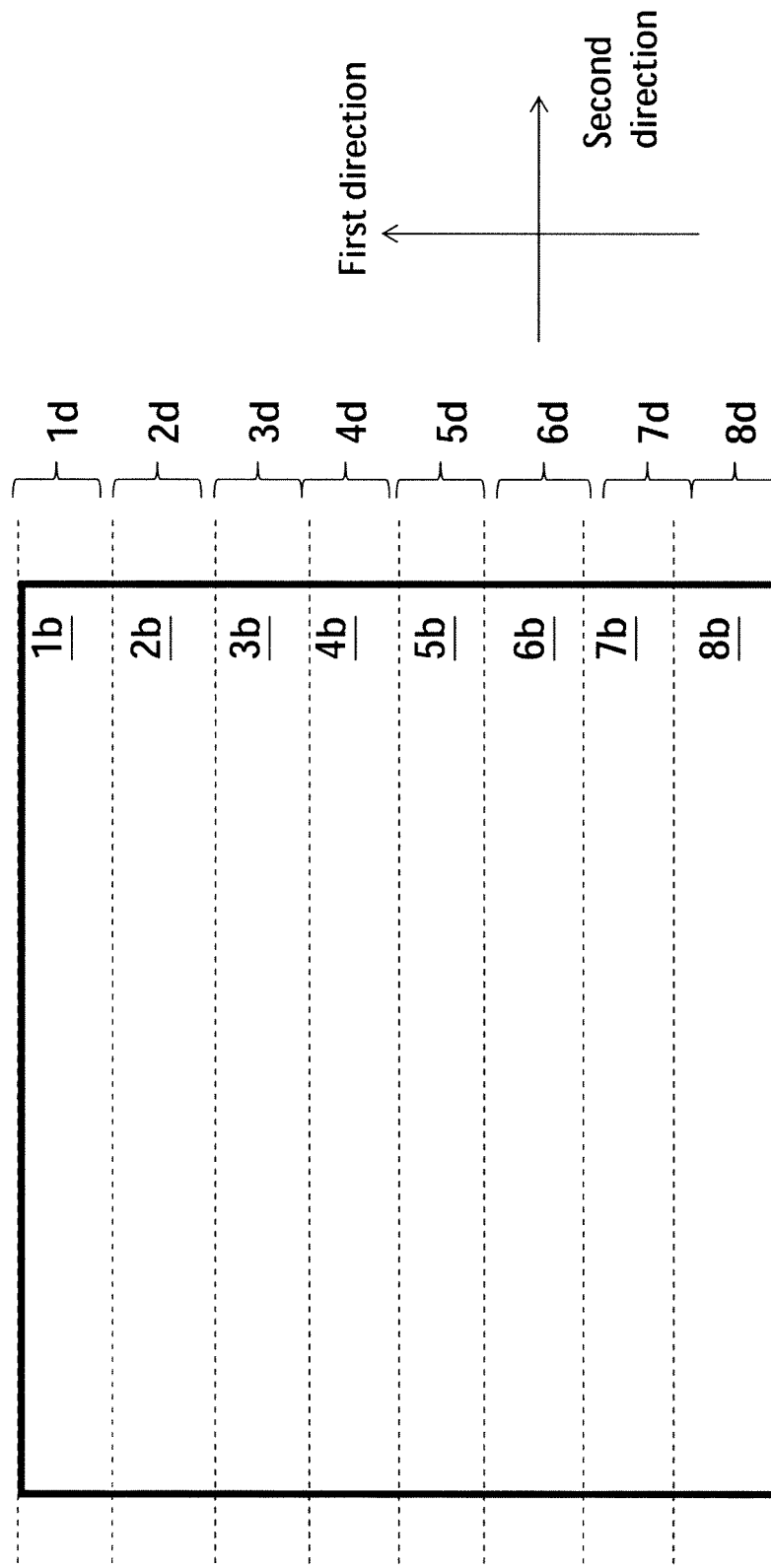
Figures 2, 6:
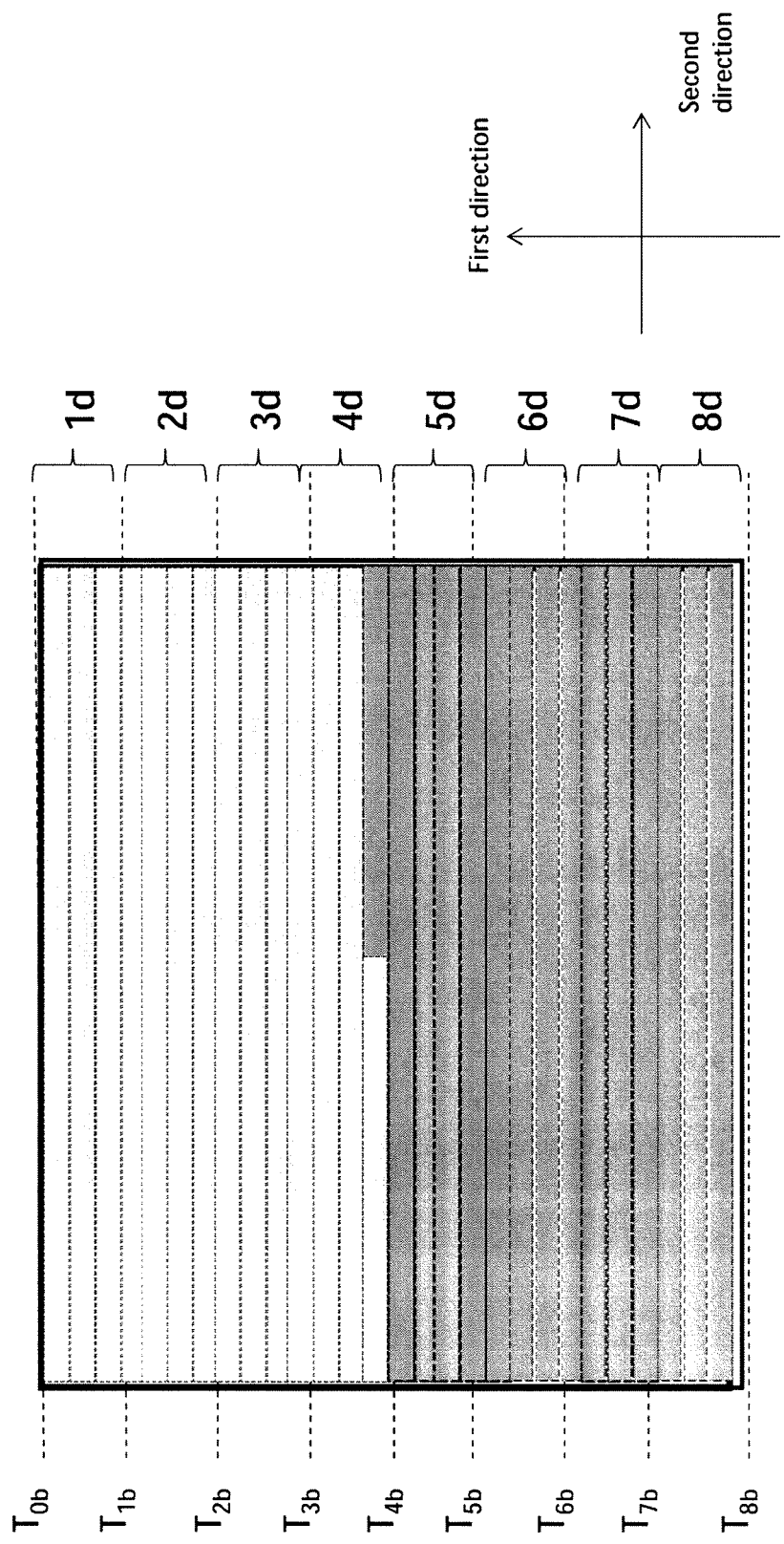
Figures 3, 6:
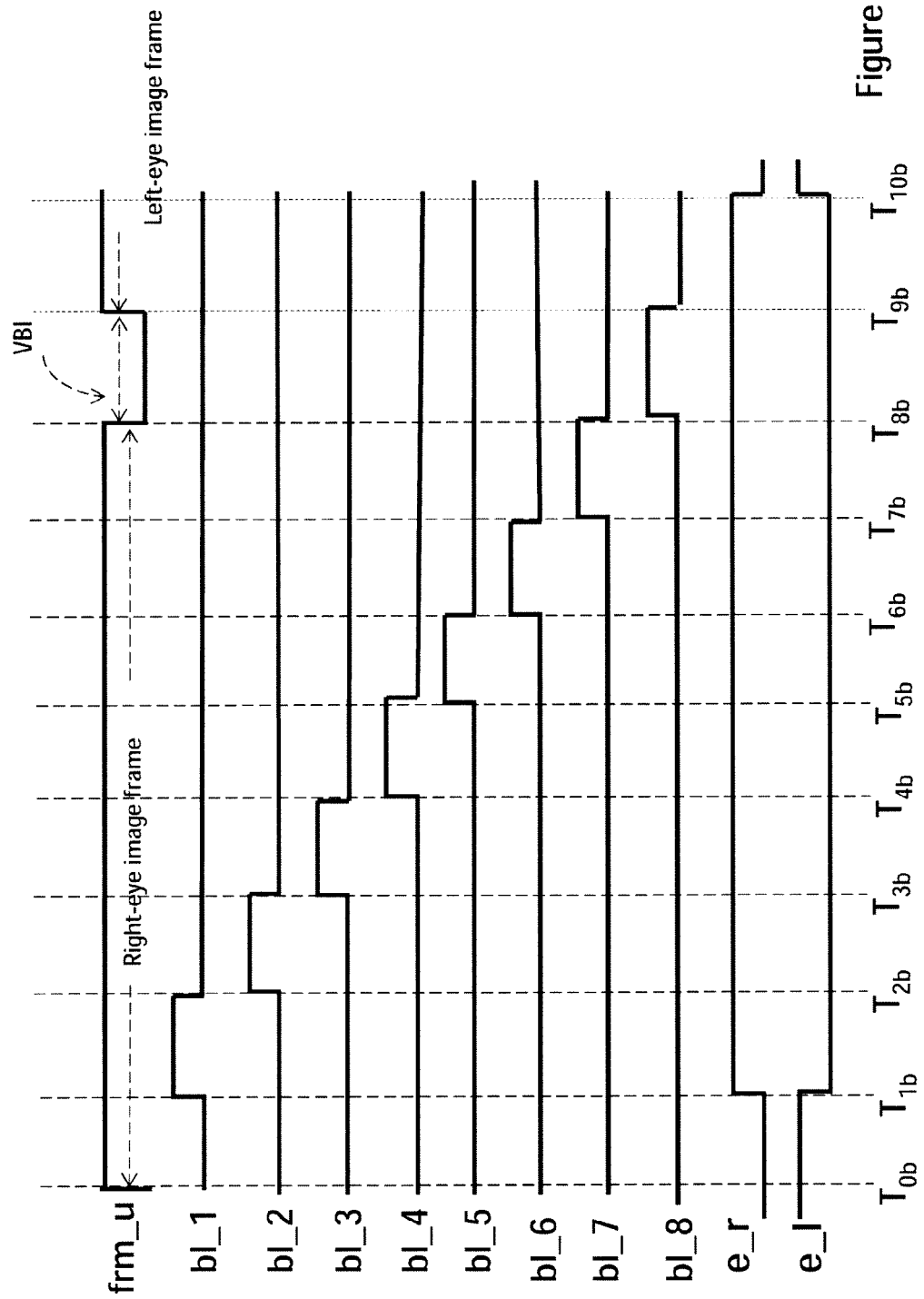

FIG. 6-1 to FIG. 6-3 are schematic diagrams of control steps for a backlight apparatus of a stereo image display device in accordance with an embodiment of the present invention. This embodiment is similar to those illustrated in FIG. 4-1 to FIG. 5-2, except that the backlight apparatus in this embodiment performs control at a higher resolution, e.g., divisions having the high resolution and respective control are performed via liquid emitting diode (LED) strings or LED groups of the backlight apparatus. Therefore, the backlight apparatus and the display apparatus in this embodiment are divided into N portions, where N is larger than two. In this embodiment, take N=8 as an example. Update of the current right-eye image frame, the interval signal associated with the current right-eye image frame, the plurality of backlight control signals and timing level state conversion of the plurality of backlight control signals are to be described below.

FIG. 6-1 is a schematic diagram of dividing methods and corresponding relationships among division portions of a backlight apparatus and a display apparatus in accordance with an embodiment of the present invention. The display unit 221 has eight equivalent portions 1d to 8d (having identical areas), and the backlight apparatus also has eight light-emitting areas 1b to 8b (having identical areas). The foregoing eight light-emitting areas 1b to 8b are defined in sequence from top to bottom in a first axis direction, and respectively correspond to the first to eight portions 1d to 8d of the display apparatus on a first plane defined by the first axis direction and a second axis direction.

In addition, the right-eye image frame also has eight portions with identical areas, i.e., a first portion 1r corresponding to the first emitting area 1b of the backlight apparatus and the first portion 1d of the display apparatus 221 to an eighth portion 8r corresponding to the eighth light-emitting area 8b of the backlight apparatus and the eighth portion 8d of the display apparatus 221 (the first to eighth portions 1r to 8r of the right-eye image frame are not shown).

FIG. 6-2 is a schematic diagram of updating of a current right-eye image frame in accordance with an embodiment of the present invention. The right-eye image frame begins updating at the time point $T_{0b}$. Scanning of this right-eye image frame is performed in the second axis direction and row-by-row in the first axis direction to replace the previous left-eye image frame displayed on the display apparatus. Update of the entire current right-eye image frame completes at a time point $T_{8b}$, which means the previous left-eye image frame is completely replaced by the current right-eye image frame.

FIG. 6-3 is a schematic diagram of an update method of a current right-eye image frame and a voltage change mechanism in accordance with an embodiment of the present invention. An interval signal frm_u changes from the logical low level to the logical high level at the time point $T_{0b}$ to form a rising edge at the time point $T_{0b}$. The rising edge triggers updating of the current right-eye image frame. The current right-eye image frame is scanned in the second axis direction, and is updated row-by-row from top to bottom in the first axis. Update of the current right-eye image frame ends at the time point $T_{1b}$, while the first backlight control signal bl_1 is triggered to change from the logical low level to the logical high level. The first backlight control signal bl_1 is maintained at the logical high level for an interval between time points $T_{1b}$ and $T_{2b}$. The first backlight control signal at the logical high level makes the first light-emitting area 1b to provide first luminance to the first portion 1d of the display apparatus, so that the first portion 1r of the updated current right-eye image frame is displayed on the first portion 1d of the display apparatus.

Update of the second portion 2r of the current right-eye image frame completes at the time point $T_{2b}$, while the second backlight control signal bl_2 is triggered from the logical low level to the logical high level. The second backlight control signal bl_2 is maintained at the logical high level for an interval between times $T_{2b}$ and $T_{3b}$ which makes the second light-emitting area 2b of the backlight apparatus provide first luminance to the second portion 2d of the display apparatus. Thus, the second portion 2r of the updated current right-eye image frame is displayed on the second portion 2d of the display apparatus.

It is noted that the first backlight control signal bl_1 is maintained at the logical high level only for the interval between the time points $T_{1b}$ and $T_{2b}$. Therefore, the first light-emitting area 1b of the backlight apparatus only provides light during the interval between the time points $T_{1b}$ and $T_{2b}$ to the first portion 1d of the display apparatus. In other words, the first portion 1r of the updated current right-eye image frame is only displayed on the first portion 1d of the display apparatus for the interval between the time points $T_{1b}$ and $T_{2b}$. Likewise, the second portion 2r of the updated current right-eye image frame is only displayed on the second portion 2d of the display apparatus during the interval between the time points $T_{2b}$ and $T_{3b}$.

Similarly, updates of the third portion 3r, the fourth portion 4r to the eighth portion 8r of the current right-eye image frame respectively end at time points $T_{3b}$, $T_{4b}$ to $T_{8b}$. Likewise, the third light-emitting area 3b, the fourth light-emitting area 4b to the eighth light-emitting area 8b of the backlight apparatus provide light to the third portion 3d, the fourth portion 4d and to the eighth portion 8d of the display apparatus during the interval between time points $T_{3b}$ and $T_{4b}$, $T_{4b}$ and $T_{5b}$, and to an $T_{8b}$ and $T_{9b}$, respectively. At the respective same intervals, the updated third portion 3r, the fourth portion 4r to the eighth portion 8r of the current right-eye image frame are respectively displayed on the third portion 3d, the fourth portion 4d to the eighth portion 8d of the display apparatus. Updates of the entire current right-eye image frame finishes at the time point $T_{8b}$, where the interval signal frm_u converts from the logical low level to the logical high level at the time point $T_{8b}$ to enter a current right-eye image frame transition interval (i.e., a right-eye image frame VBI).

In addition, a right-eye shield control signal e_r is provided at the logical low level during an interval between time points $T_{1b}$ and $T_{10b}$, so that the right-eye shield turns off during the interval between the time points $T_{1b}$ and $T_{10b}$, so that the right eye of the viewer views each portion including the first portion 1r to the eighth portion 8r of the updated current right-eye image frame during the interval between the time points $T_{1b}$ and $T_{10b}$. As mentioned above, the right eye of the viewer perceives a complete right-eye image frame because of vision persistence. In addition, a left-eye control signal e_1, at the logical high level during the interval between the time points $T_{1b}$ and $T_{10b}$, turns on (with shielding) the left-eye shield of the pair of glasses during the interval between the time points $T_{1b}$ and $T_{10b}$, so that the left eye of the viewer cannot view any portion of the current right-eye image frame in this period of time.

In the abovementioned embodiment, the duty cycle of the right-eye image frame VBI is about 10% while the cycle of the VBI is 50% (equal to the cycle of the left-eye shield turn-off interval); therefore, there is no need to extend the length of VBI as required in the prior art to increase a light-emitting efficiency of a display system. In addition, the light-emitting efficiency of the display system is also increased by increasing a current of the backlight apparatus or increasing the number of light-emitting particles within a unit area of the backlight apparatus.

In conclusion, in this embodiment, updates of the portions 1r to 8r of the current right-eye image frame are done in sequence, and each light-emitting area provides backlights having the first luminance to each of the portions 1d to 8d of the display apparatus according to timing, so that the updated portions 1r to 8r of the current right-eye image frame are respectively displayed on the portions 1d to 8d of the display apparatus during different timing intervals. The viewer perceives the entire current right-eye image frame that is continuously displayed by appropriately turning off or turning on the right-eye shield of the pair of glasses. Although it is not mentioned in the description or figures, a person having ordinary skill in the art readily knows that, the left-eye image frame and the corresponding left-eye control signals are realized in the same method.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A control apparatus used in a three-dimensional (3D) display apparatus, comprising:
    an image processing unit, for generating an interval signal according to an image source signal, with the interval signal having a plurality of first timing intervals and a plurality of second timing intervals; and
    a backlight control unit, for generating a backlight control signal in response to the interval signal, the backlight control signal being configured to control an illuminating area of a backlight device so that the illuminating area provides a first luminance in the first timing intervals and a second luminance in the second timing intervals in sequence,
    wherein each first timing interval is an image frame update interval, each second timing interval is a vertical blanking interval (VBI), and the plurality of first timing intervals and the plurality of second timing intervals are adjacent to each other and are time-interleaved,
    wherein the backlight control device is configured to generate a plurality of backlight control signals comprising a first backlight control and a second backlight control signal according to the interval signal, and the backlight device comprises a first light-emitting area corresponding to the first backlight control signal and a second light-emitting area corresponding to the second backlight control signal,
    wherein each first timing interval comprises a first sub-interval and a second sub-interval, and each second timing interval comprises a third sub-interval and a fourth sub-interval, and,
    wherein the first light-emitting area provides the first luminance in the second sub-interval of each first timing interval and in the third sub-interval of each second timing interval according to the first backlight control signal, and the first light-emitting area provides the second luminance in the first sub-interval of each first timing interval and the fourth sub-interval of each second timing interval according to the first backlight control signal.

2. The control apparatus as claimed in claim 1, wherein the second light-emitting area provides the first luminance in the first sub-interval of each first timing interval and in the fourth sub-interval of each second timing interval according to the second backlight control signal, and the second light-emitting area provides the second luminance in the second sub-interval of each first timing interval and in the third sub-interval of each second timing interval according to the second backlight control signal.

3. The control apparatus as claimed in claim 2, wherein the glasses control signal enables one of a right-eye shield and a left-eye shield of a pair of 3D glasses to be turned off in the second sub-interval of each first timing interval, the adjacent second timing interval and the first sub-interval of the next adjacent first timing interval, and the right-eye shield and the left-eye shield are turned off or turned on in a time-interleaved way.

4. The control apparatus as claimed in claim 1, wherein the first light-emitting area and the second light-emitting area provide the first luminance and the second luminance in a complementary way in accordance with the first backlight control signal and the second backlight control signal respectively.

5. The control apparatus as claimed in claim 4, wherein a luminance difference between the first luminance and the second luminance is set such that a viewer perceives the first light-emitting area and the second light-emitting area one at a time.

6. A control apparatus used in a three-dimensional (3D) display apparatus, comprising:
    an image processing unit, for generating an interval signal according to an image source signal, with the interval signal having a plurality of first timing intervals and a plurality of second timing intervals; and
    a backlight control unit, for generating a backlight control signal in response to the interval signal, the backlight control signal being configured to control an illuminating area of a backlight device so that the illuminating area provides a first luminance in the first timing intervals and a second luminance in the second timing intervals in sequence, wherein each first timing interval is an image frame update interval, each second timing interval is a vertical blanking interval (VBI), and the plurality of first timing intervals and the plurality of second timing intervals are adjacent to each other and are time-interleaved, and wherein the backlight control device generates at least three backlight control signals according to the interval signal, and the backlight device comprises three light-emitting areas that respectively correspond to the three backlight control signals, and each first timing interval comprises three sub-intervals that respectively correspond to the three light-emitting areas.

7. The control apparatus as claimed in claim 6, wherein each light-emitting area provides the first luminance in one of the sub-intervals of each first timing interval according to a corresponding backlight control signal, and provides the second luminance in other two sub-intervals of each first timing interval, wherein the three light-emitting areas provide the first luminance in a time-interleaved way.

8. The control apparatus as claimed in claim 7, further comprising a glasses control device for generating a glasses control signal according to the interval signal to turn off a right-eye shield and turn on a left-eye shield of a pair of 3D glasses in several of the sub-intervals of each first timing interval, in each second timing interval and one sub-interval of the next adjacent first timing interval.

9. The control apparatus as claimed in claim 8, wherein the image processing unit generates a left-eye image frame and a right-eye image frame according to the image source signal, the left-eye image frame is perceived through the turned-off left-eye shield while the light-emitting area, which corresponds to the left-eye image frame, provides the first luminance, and the right-eye image frame is perceived through the turned-off right-eye shield while the light-emitting area, which corresponds to the right-eye image frame, provides the first luminance.

10. A control apparatus used in a three-dimensional (3D) display apparatus, comprising:

an image processing unit, for generating an interval signal according to an image source signal, with the interval signal having a plurality of first timing intervals and a plurality of second timing intervals; and a backlight control unit, for generating a backlight control signal in response to the interval signal, the backlight control signal being configured to control an illuminating area of a backlight device so that the illuminating area provides a first luminance in the first timing intervals and a second luminance in the second timing intervals in sequence, wherein each first timing interval is an image frame update interval, each second timing interval is a vertical blanking interval (VBI), and the plurality of first timing intervals and the plurality of second timing intervals are adjacent to each other and are time-interleaved, and wherein the backlight device further comprises a plurality of light-emitting areas, the backlight device is configured to generate a plurality of backlight control signals corresponding to the light-emitting areas according to the interval signal, and each first timing interval and each adjacent second timing interval has a plurality of sub-intervals respectively corresponding to the light-emitting areas, the backlight control signals respectively control the light-emitting areas to provide the first luminance in corresponding sub-intervals, and when one of the light-emitting areas provides the first luminance, the other light-emitting areas provide the second luminance.

11. The control apparatus as claimed in claim 10, wherein each first timing interval corresponds to an entire updating time of an image frame update signal, and the light-emitting area corresponding to the present sub-interval is for displaying a portion of the image frame updating signal that has finished updating in a previous sub-interval.

12. The control apparatus as claimed in claim 11, further comprising a glasses control device, for generating a glasses control signal according to the interval signal to respectively turn off a right-eye shield and a left-eye shield of a pair of 3D glasses in a time-interleaved way until all the light-emitting areas provide the first luminance in sequence.

* * * * *